United States Patent [19]
Takemoto et al.

[11] Patent Number: 5,881,357
[45] Date of Patent: Mar. 9, 1999

[54] METHOD AND APPARATUS FOR FILLING POWDER

[75] Inventors: Shigehide Takemoto, Toyota; Hiroshi Okajima, Aichi-ken; Mikio Kondoh, Toyoake, all of Japan

[73] Assignee: Toyota Jidosha Kabushiki Kaisha, Toyota, Japan

[21] Appl. No.: 825,388

[22] Filed: Mar. 28, 1997

[30] Foreign Application Priority Data

Mar. 29, 1996 [JP] Japan ................................. 8-075945

[51] Int. Cl.[6] ......................................................... B22F 3/12
[52] U.S. Cl. ........................ 419/38; 264/56; 29/DIG. 31; 425/78
[58] Field of Search ................................. 419/38; 264/56; 29/DIG. 31; 425/78

[56] References Cited

U.S. PATENT DOCUMENTS 5,250,255 10/1993 Sagawa et al. ............................ 419/38
5,397,530 3/1995 Narasimhan et al. ....................... 419/1
5,514,327 5/1996 Schneider ................................... 419/36

FOREIGN PATENT DOCUMENTS

57-79119 5/1982 Japan .

*Primary Examiner*—Daniel J. Jenkins
*Attorney, Agent, or Firm*—Pillsbury Madison & Sutro LLP

[57] ABSTRACT

A method and apparatus for filling a cavity with powder wherein a pipe having holes for discharging gas is disposed in a powder box and gas is discharged into the powder in the powder box as the powder enters the cavity so that particles of the powder are movable relative to each other. Due to the gas discharge, the powder can enter the cavity smoothly without whirling up in the cavity and settling unevenly, so that a filling time period is shortened and a particle size distribution in the cavity is uniform.

29 Claims, 9 Drawing Sheets

MOVEMENT OF POWDER BOX

FORWARD DIRECTION →

FIG. 13

FORWARD DIRECTION →

FORWARD DIRECTION

METHOD AND APPARATUS FOR FILLING POWDER

This application is based on application No. HEI 8-75945 filed in Japan on Mar. 29, 1996, the content of which is incorporated hereinto by reference.

BACKGROUND OF THE INVENTION

1. Field of the Invention

The present invention relates to a method of and apparatus for filling powder into a cavity formed in a die.

2. Description of Related Art

In a conventional powder filling method, as disclosed in Japanese Utility Model Publication SHO 57-79119, powder in a powder box is dropped into a cavity formed in a die when the powder box is brought to a position just above the cavity.

However, in the conventional powder filling method, when air in the cavity is replaced by the dropped powder, light particles whirl up while heavy particles drop quickly so that unevenness in particle size distribution occurs in the cavity. As a result, it is difficult for a sinter made from the powder to have a uniform density distribution and an accurate dimension. To obtain a uniform distribution, it would be effective to shake the cavity, but shaking would make the filling time period too long.

SUMMARY OF THE INVENTION

An object of the present invention is to provide a method and apparatus capable of filling powder in a cavity uniformly and in a short time period.

A method for filling powder into a cavity formed in a die according to the present invention includes the steps of: (1) supplying powder into a powder box which is movable toward and away from a position just above the cavity and in which at least one pipe having a plurality of holes is formed therein for supplying gas therethrough, and supplying gas into the powder in the powder box through the plurality of gas holes so that particles of the powder in the powder box are movable relative to each other, and (2) moving the powder box to the position just above the cavity so that the powder in the powder box enters the cavity at least by gravity.

An apparatus for filling powder into a cavity formed in a die according to the present invention includes: (1) a powder box movable toward and away from a position just above the cavity, the powder box being open at a bottom thereof, (2) at least one pipe disposed within the powder box, each pipe having a plurality of holes formed therein for supplying gas therethrough into the powder in the powder box, and (3) a gas source connected via a hose with the pipe.

In the above-described method and apparatus according to the present invention, because the particles of the powder in the powder box are movable relative to each other due to the gas discharged to the powder through the holes (to an extent which causes no bubbling at an upper surface of the powder in the powder box), the powder can enter the cavity easily and smoothly without whirling up in the cavity, so that unevenness in particle size distribution is unlikely to be caused in the cavity and entry of the powder is conducted in a short period of time.

BRIEF DESCRIPTION OF THE DRAWINGS

The above and other objects, features, and advantages of the present invention will become more apparent and will be more readily appreciated from the following detailed description of the preferred embodiments of the present invention in conjunction with the accompanying drawing, in which.

DETAILED DESCRIPTION OF THE PREFERRED EMBODIMENT

Figure 15:
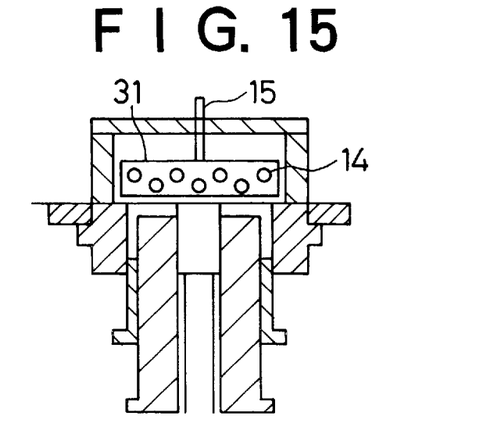
FIG. 15 is a cross-sectional view of a powder filling apparatus according to a third embodiment of the present invention.
Figure 16:
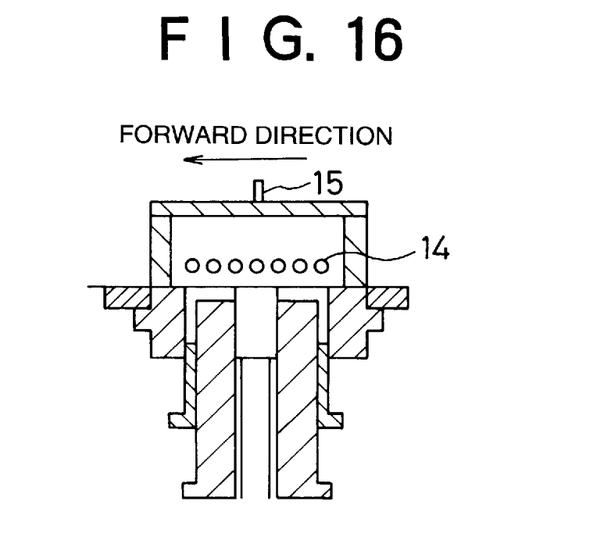
FIG. 16 is a cross-sectional view of a powder filling apparatus according to a fourth embodiment of the present invention.
Figure 17:
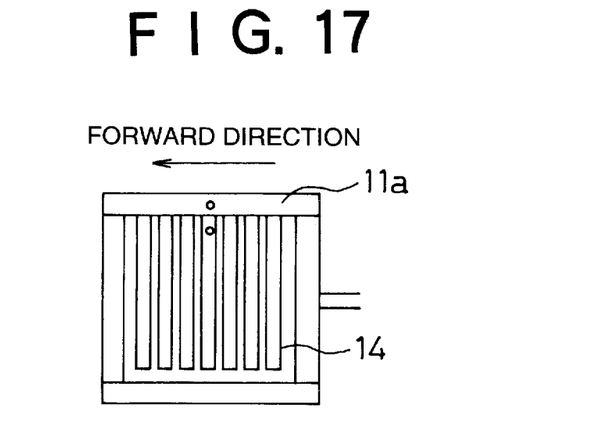
FIG. 17 is a plan view of the apparatus of FIG. 16.
Figure 18:
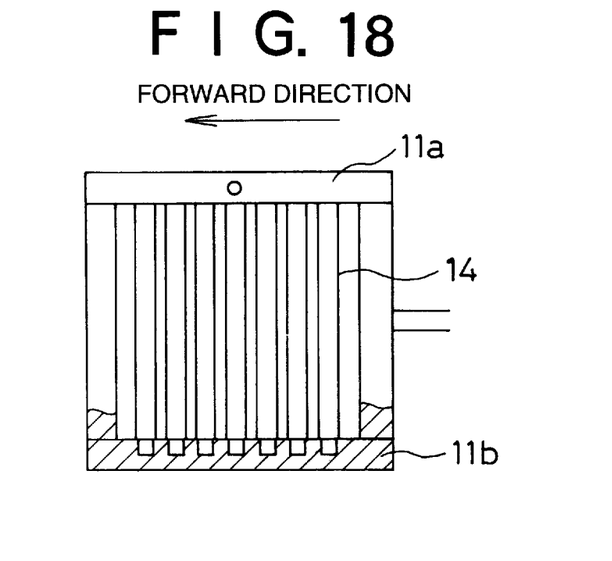
FIG. 18 is a plan view, partially shown in cross-section, of a powder filling apparatus according to a fifth embodiment of the present invention.
Figure 23:
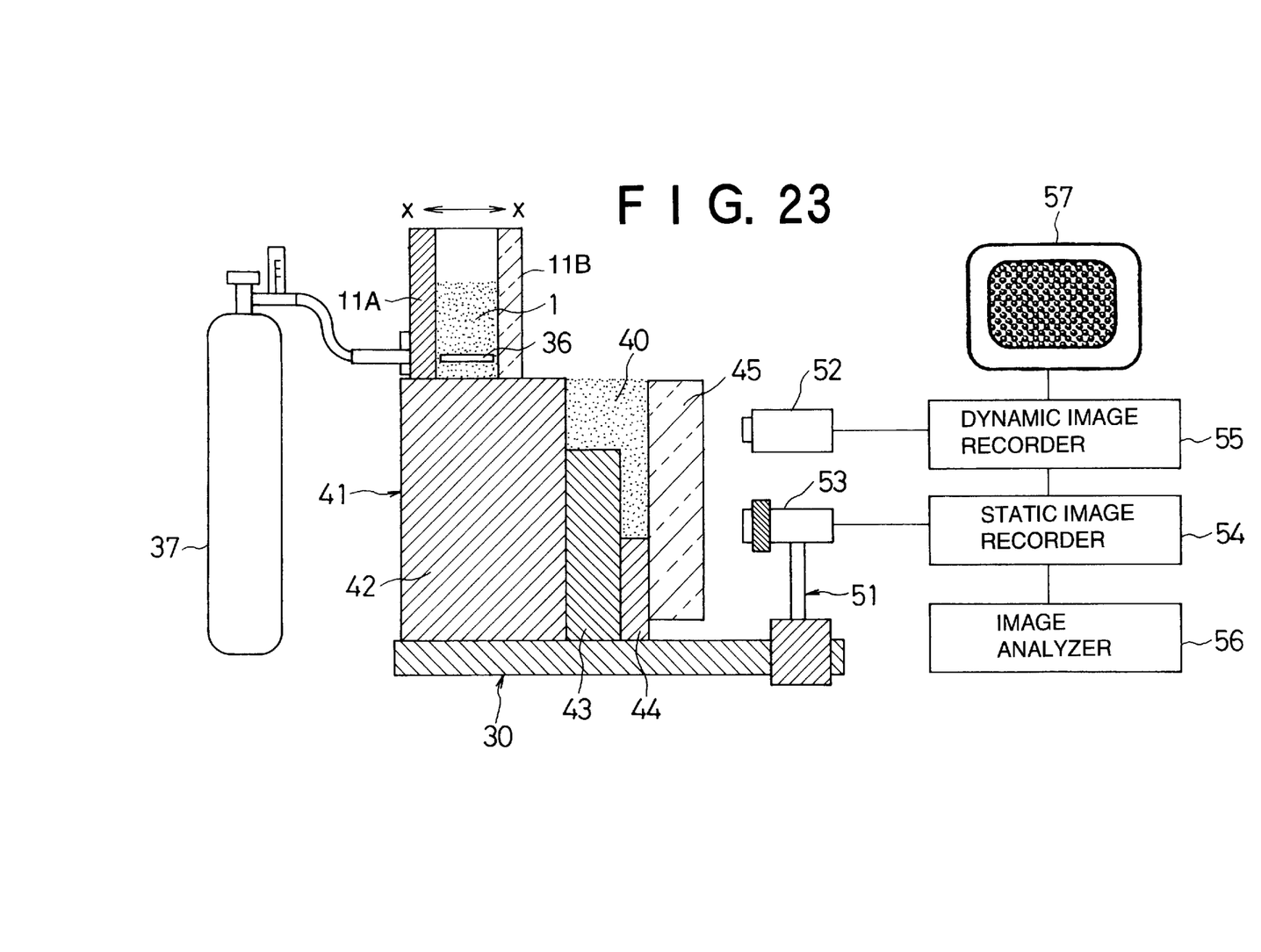
FIG. 23 is a cross-sectional view of a powder filling apparatus according to a sixth embodiment of the present invention.
Figure 24:
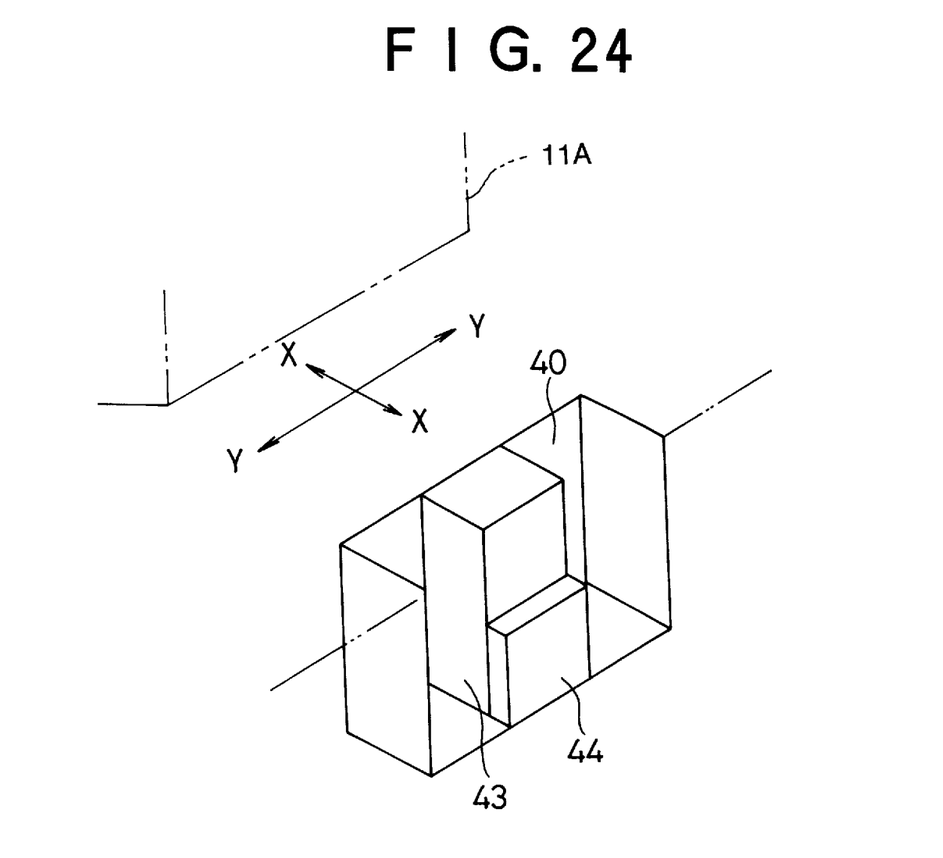
FIG. 24 is an enlarged oblique view of a cavity of the apparatus of FIG. 23.

FIGS. 1–10 illustrate a powder filling method and apparatus according to a first embodiment of the present invention; FIGS. 11–14 illustrate a second embodiment of the present invention; FIG. 15 illustrates a third embodiment of the present invention; FIGS. 16 and 17 illustrate a fourth embodiment of the present invention; FIGS. 18–22 illustrate a fifth embodiment of the present invention; FIGS. 23 and 24 illustrate a sixth embodiment of the present invention. Portions common or similar to all of the embodiments of the present invention are denoted with the same reference numerals throughout all of the embodiments of the present invention.

First, portions common or similar to all of the embodiments of the present invention will be explained with reference to, for example, FIGS. 1–10.

Figure 1:
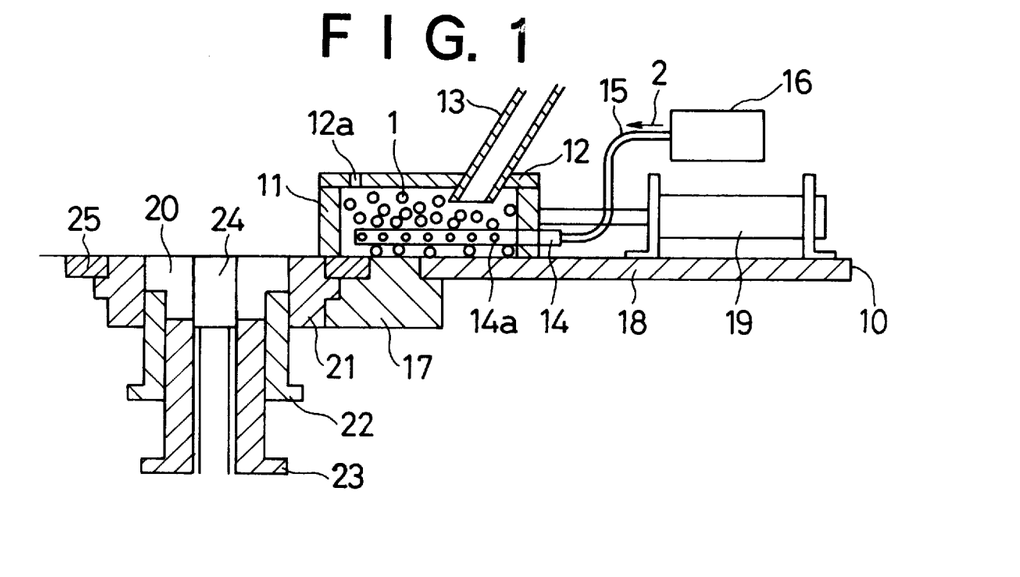
FIG. 1 is a cross-sectional view of a powder filling apparatus according to a first embodiment of the present invention before filling powder into a cavity.
Figure 2:
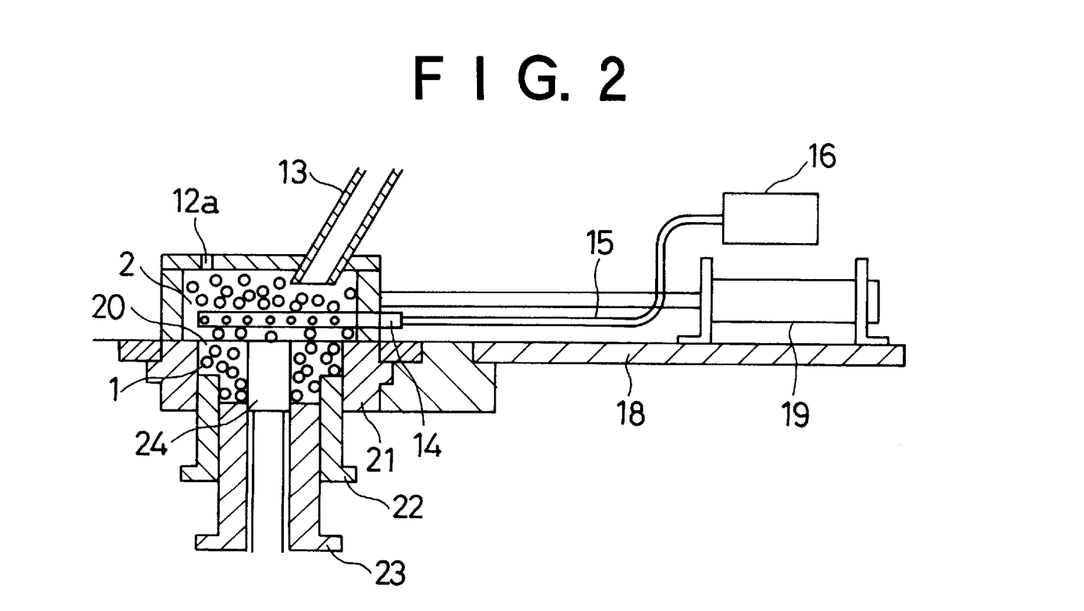
FIG. 2 is a cross-sectional view of the apparatus of FIG. 1 after filling the powder into the cavity.

In FIGS. 1 and 2, powder 1 is, for example, one for use in sintering. In the case of sintering powder, the powder 1 includes iron powder as a base powder, and further includes powder of metal such as copper by 2 wt %, carbon powder by 0.5–0.8 wt %, and lubricant powder by about 1 wt %. The size of particles of the powder is 30 to 150 $\mu$m.

The powder filling apparatus includes a powder box 11. A top of the powder box 11 is covered by a cover 12 and a bottom of the powder box 11 is open. The cover 12 is obliquely penetrated by a pipe or hose 13 which supplies the powder 1 into the powder box 11 therethrough. The cover 12 has an exhaust hole 12a formed therein for exhausting a gas from an interior of the powder box 11 to the atmosphere.

At least one pipe 14 is disposed in the powder box 11. Each pipe 14 has a plurality of gas discharge holes (hereinafter, hole) 14a for discharging gas therethrough. The pipe 14 is supported by the powder box 11 at, for example, a side wall of the powder box 11. The pipe 14 penetrates a wall of the powder box 11 and communicates with a gas source 16 via a flexible hose 15. The flexible hose 15 enables the powder box 11 to move. The gas supplied from the gas source 16 is discharged into the powder 1 in the powder box 11 through the holes 14a whereby particles of the powder 1 in the powder box 11 are movable relative to each other. The amount of gas discharged into the powder box 11 is controlled by a flow control valve (not shown).

The powder box 11 is on a table 18 and is slidable on an upper surface of the table 18. The table 18 is fixed to a die holder 17. A drive device 19 is coupled to the table 18. The drive device 19 includes a cylinder for driving the powder box 11 toward and away from a position just above the cavity 20 in a horizontal direction.

A die 21 is coupled to the die holder 17 via a retainer 25. The retainer 25 may be integral with the table 18. In a space defined by the die 21, annular lower punches 22 and 23 and a core rod 24 in the form of a pillar are disposed. The lower punch 23 is a fixed member, while the die 21, the lower punch 22 and the core rod 24 are movable in a vertical direction relative to the lower punch 23. The cavity 20 is defined between an inner surface of the die 21 and an outer surface of the core rod 24 above the lower punches 22 and 23.

The apparatus can conduct both gravity filling and suction filling. In gravity filling, the powder 1 is dropped into the cavity 20 using the gravity forces on the powder itself, while in suction filling, the powder 1 is suctioned into the cavity 20 by a negative pressure which is generated in the cavity 20 when the die 21 and the core rod 24 is moved upward relative to at least one of the lower punches 22 and 23.

Preferably, the pipe 14 is of the following structures and arrangements.

The pipe 14 is made from metal or resin, and preferably from stainless steel for preventing rust and maintaining strength.

Preferably, the pipe 14 has a circular cross section, or a oval (including an elongated circle) cross-section having its long axis directed in a vertical direction. The pipe 14 may have a cross-section combining at least two pipes as shown in case 4 of FIG. 9. In the case of a circular cross-section, the manufacture of the pipe is easy. In the case of an oval cross-section, a space between adjacent pipes can be kept large so that good movability of the powder is assured in the vertical direction.

Preferably, an outer diameter D (see FIG. 6) of the pipe 14 is equal to or greater than 1 mm and equal to or smaller than 3 mm. The reason for the 1 mm or greater dimension is to assure good volume flow of gas and high strength in the pipe, and the reason for the 3 mm or smaller dimension is to assure good movability of the powder around the pipe.

Preferably, in a transverse cross-section of the pipe 14, 1–6 holes 14a are formed at equal intervals in a circumferential direction of the pipe. An angle $\theta$ (see FIG. 7) between the axis of the hole 14a and the horizontal axis is preferably at 30–60 degrees. The distance between adjacent holes 14a is 3–10 mm in a longitudinal direction of the pipe 14.

In a case where a plurality of pipes 14 is provided in parallel with each other, the ratio of a distance w (see FIG. 11) between adjacent pipes 14 to a width W (see FIG. 11) of the powder box 11 is set at 0.02 or greater and 0.3 or smaller. The reason for the 0.02 value is to supply gas evenly to the powder and the reason for the 0.3 value is to assure smooth movement of the powder between adjacent pipes. Further, the pipe 14 is disposed above and spaced from the bottom of the powder box 11. The ratio of a distance h of the pipe 14 from the bottom of the powder box 11 to a height H of the powder box 11 is set at 0.01 or greater and 0.3 or smaller. The reason for the range between 0.01 and 0.3 is to dispose the pipe 14 at a lower portion of the interior of the powder box 11 so that almost all particles of the powder 1 positioned above the pipe 14 are movable with respect to each other.

A diameter of each hole 14a is 10 $\mu$m or greater and 200 $\mu$m or smaller. A combination of different diameters of holes is possible. For example, a group of holes having a smaller diameter may be formed in a lower half portion of the pipe 14 and a group of holes having a larger diameter may be formed in an upper half portion of the pipe 14 so that the force acting on the lower portion of the powder from the upper portion of the powder is decreased whereby the density of the powder is more uniform.

The holes 14a can be formed by drilling or laser. When the pipe 14 is made from a sinter or mesh, the pipe 14 is porous and can let gas pass therethrough so that particular holes do not need to be formed therein. When the pipe 14 is made from resin, the holes 14a may be formed at the same time as the forming of the pipe.

A powder filling method using the above apparatus will now be explained.

FIG. 1 illustrates a waiting state of the powder filling apparatus 10. During waiting, the powder 1 is supplied through the hose 13 into the powder box 11. At that time, gas 2 is discharged through the holes 14a into the powder 1 so that the particles of the powder 1 are movable with respect to each other. The surface of the powder 1 in the powder box 11 is not bubbling. The gas discharged into the powder box 11 is exhausted to the atmosphere through the exhaust hole 12a formed in the powder box 11.

Then, the powder box 11 is moved by the drive device 19 toward a position just above the cavity 20. When the powder box 11 comes to a position where a front end of the interior of the powder box 11 communicates with the cavity 20, the powder 1 in the powder box 11 starts to enter or flow into the cavity 20 by gravity so that at least the cavity 20 is filled with the powder 1. In this instance, since the particles of the powder 1 in the powder box 11 are movable relative to each other, the powder can flow smoothly into the cavity 20 without causing self-locking between particles and without causing whirling of light and small particles toward the top of the cavity 20. As a result, the powder in the cavity 20 is uniform in particle size and density, and filling the cavity with the powder is conducted in a short period of time.

During gas supply, the ratio of the amount Vg of gas supplied into the powder box 11 to the volume Vp of the powder 1 in the powder box 11 is set at 0.05 sec$^{-1}$ or greater and 0.4 sec$^{-1}$ smaller. The reason for the 0.05 sec$^{-1}$ value is to cause the particles to be effectively movable with each other and the reason for the 0.4 sec$^{-1}$ value is to prevent bubbling from occurring at the surface of the powder 1.

Preferably, the gas is selected from dry air, gas not containing oxygen such as nitrogen, and inert gas such as helium and argon. Hot gas is preferably used to heat the powder 1 or to maintain the temperature of heated powder 1. However, gas having an ambient temperature may be used.

Figure 8:
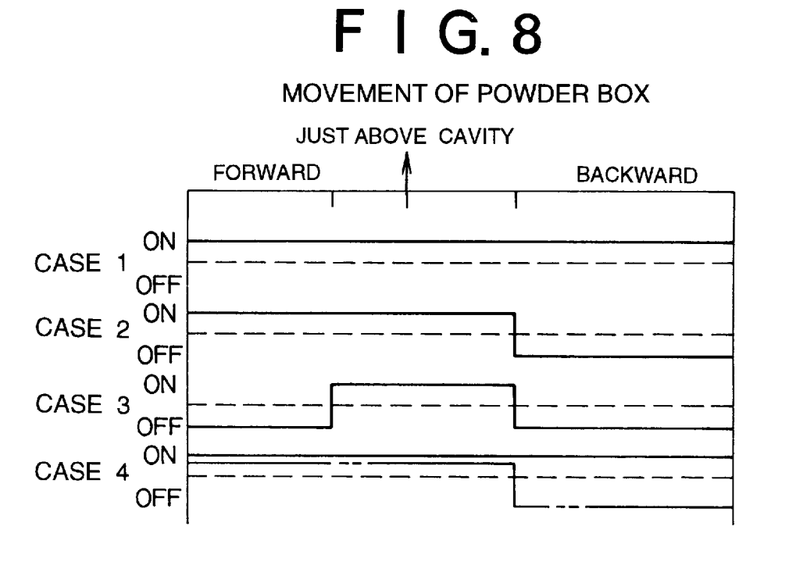
FIG. 8 is a chart illustrating various gas supply timings for the apparatus of FIG. 1.

FIG. 8 illustrates a few examples of gas supply timings. The gas supply timing may be changed in order ① to improve the movability of particles, ② to decrease the cost of gas consumed, and ③ to decrease the force acting on the bottom portion of the powder.

Figure 9:
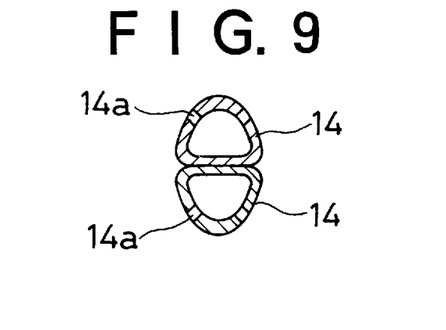
FIG. 9 is an enlarged cross-sectional view of a pipe used in case 4 of the gas supply timings of FIG. 8.

More particularly, in case 1 of FIG. 8, gas is supplied into the powder box 11 during the entire stroke of the powder box. In case 2 of FIG. 8, to satisfy requirement ② above, supply gas is stopped during backward movement of the powder box 11. In case 3 of FIG. 8, to satisfy requirement ② above, gas is supplied only while at least a portion of the powder box 11 is just above the cavity 20. In case 4 of FIG. 8, a combination pipe of FIG. 9 is used, and satisfy requirements ①, ② and ③ above, the supply of gas in only the lower pipe is stopped during backward movement of the powder box 11.

Figure 3:
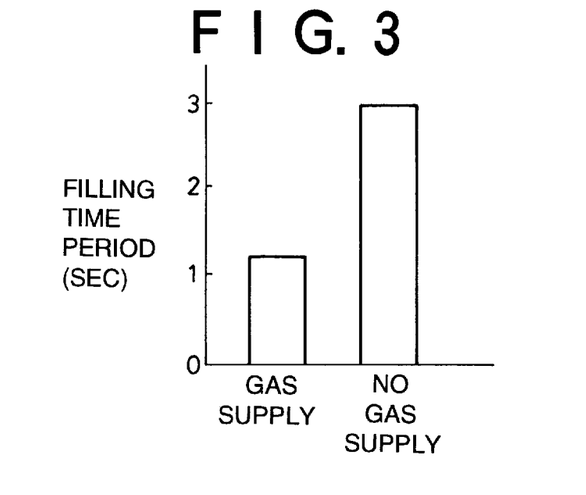
FIG. 3 is a histogram illustrating time periods needed to fill the cavity with powder in the method conducted using the apparatus of FIG. 1 and in the conventional method.

FIG. 3 illustrates results of tests. In the tests, a cavity having a thickness of 1 mm, a width of 20mm, and a depth of 40 mm was used, and time periods were measured to fill the cavity with powder. In the case where no gas was supplied, the cavity could not be filled with powder in one reciprocal motion of the powder box, and a plurality of reciprocal motions was necessary which prolonged the filling time period. On the other hand, in the case where gas was supplied maintaining the rate of Vg/Vp at 0.2, the cavity could be filled with powder in only one reciprocal motion of the powder box whereby the filling time period was shortened considerably.

Figure 10:
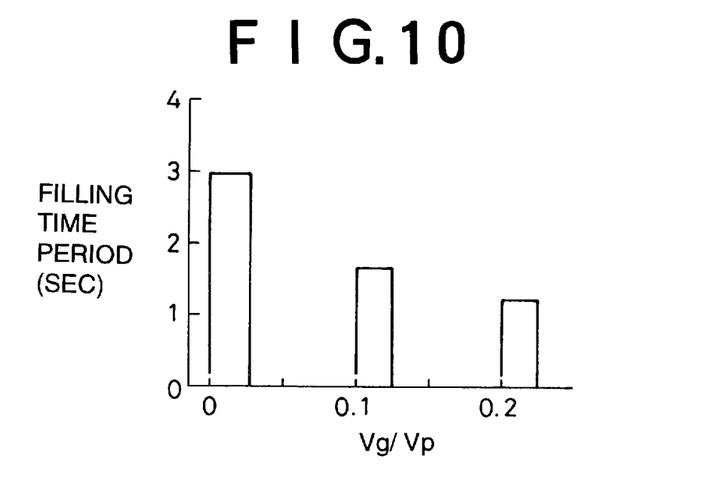
FIG. 10 is a graph illustrating the relationship between a powder filling time period and the amount of gas supplied to the powder box of the apparatus of FIG. 1.
Figure 11:
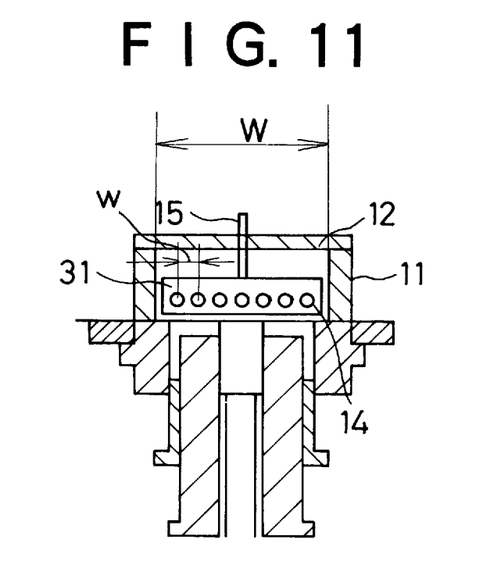
FIG. 11 is a cross-sectional view of a powder filling apparatus according to a second embodiment of the present invention.
Figure 12:
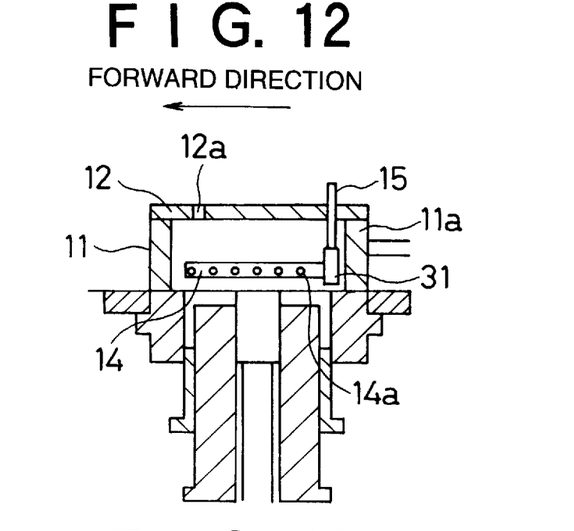
FIG. 12 is a cross-sectional view of the apparatus of FIG. 11 as viewed from a direction perpendicular to the view direction of FIG. 11.

FIG. 10 illustrates the results of tests wherein the gas amount is varied and the filling time periods were measured. In the tests, the dimensions (with respect to the references, see FIG. 6) and conditions were set as follows: W=100 mm, w=5 mm, D=1.5 mm, d=0.05 mm, θ=45°, and t=1 mm. Further, Vg/Vp was set at 0–0.3. As seen from FIG. 10, the larger the amount of gas 2, the shorter the filling time period.

Figure 4:
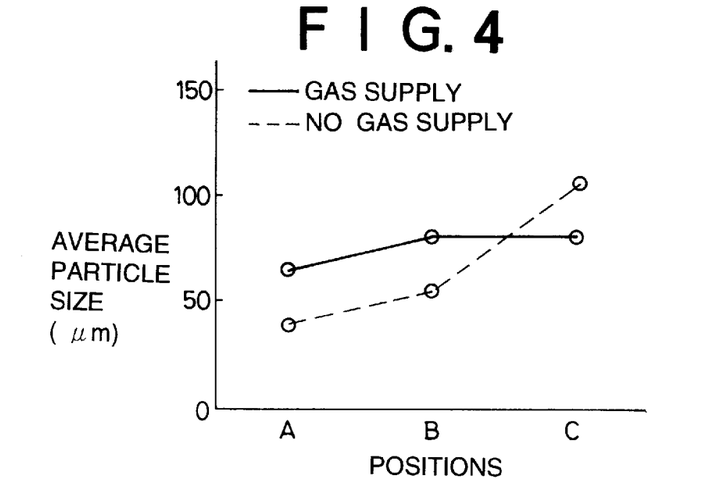
FIG. 4 is a graph illustrating particle sizes measured at positions A, B, and C in the cavity in the method conducted using the apparatus of FIG. 1 and in the conventional method.
Figure 5:
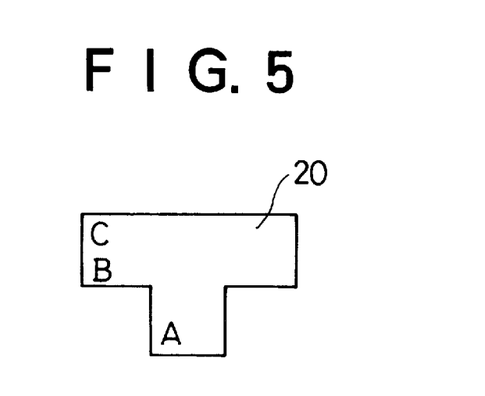
FIG. 5 is a cross-sectional view of the cavity illustrating the positions A, B, and C of FIG. 4.
Figure 6:
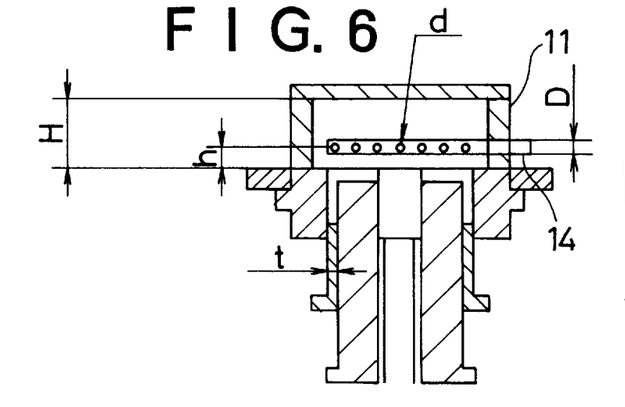
FIG. 6 is a cross-sectional view of a powder box and a cavity of the apparatus of FIG. 1, various dimensions of which are denoted with reference letters.
Figure 7:
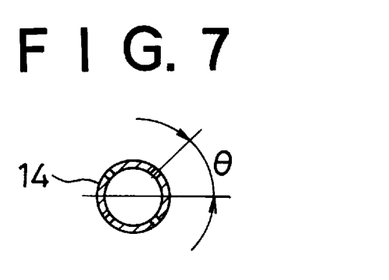
FIG. 7 is an enlarged cross-sectional view of a pipe of the apparatus of FIG. 6 wherein location of holes is denoted with a reference letter.

FIG. 4 illustrates how uniformly the cavity 20 was filled with the powder 1 when gas was supplied. The shape of the cavity 20 used in the tests is shown in FIG. 5. The test results of FIG. 4 show the sizes (average sizes) of particles measured at positions A, B and C of FIG, 5. As seen from FIG. 4, in the case where gas was not supplied, fine particles collected at positions A and B, and coarse particles collected at position C. In contrast, in the case where gas was supplied, the size of particles at every position was considerably uniform.

Portions unique to each embodiment of the present invention will now be explained.

With the first embodiment of the present invention, all was explained above.

FIGS. 11–14 illustrates the second embodiment of the present invention. In the embodiment, the plurality of pipes 14 are oriented parallel to the movement direction of the powder box 11. A horizontally extending support block 31 is disposed in the powder box 11 and is fixed to the side wall 11a of the powder box 11. A gas passage 32 extending perpendicular to the movement direction of the powder box 11 is formed in the support block 31. The gas passage 32 communicates with the flexible hose 15. Both ends of the gas passage 32 are closed. A plurality of apertures 33 are perforated to communicate the gas passage 32, and each pipe 14 is inserted into and fixed to each of the apertures 33 so that each pipe 14 communicates with the gas passage 32.

Due to this structure, the powder box 11 is moved toward the position just above the cavity 20, and the force from the powder 1 acts on each pipe 14 in a direction along the pipe 14. As a result, a bending moment is unlikely to act on the connecting point of the pipe 14 with the support block 31 so that the life of the apparatus is long.

Figure 13:
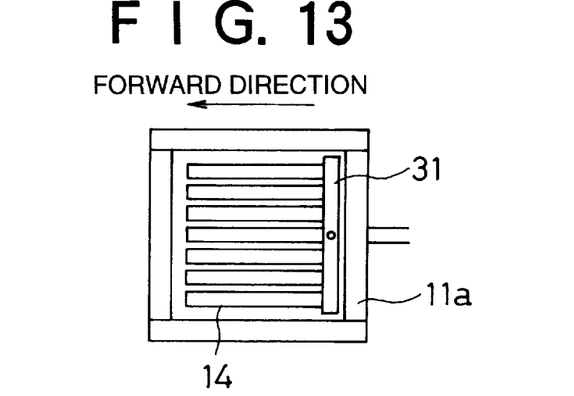
FIG. 13 is a plan view of the apparatus of FIG. 11.
Figure 14:
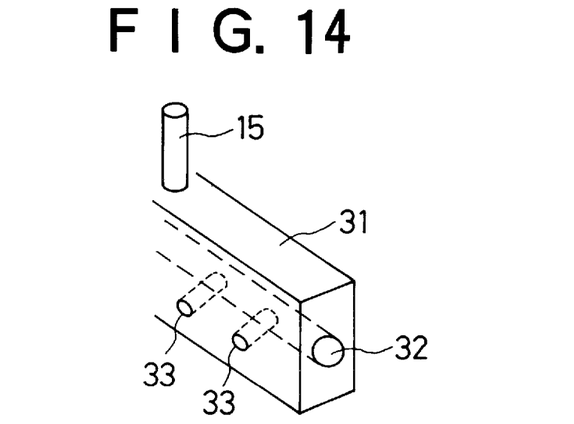
FIG. 14 is an oblique view of a support block of the apparatus of FIG. 11.

FIG. 15 illustrates a third embodiment of the present invention. In the embodiment, the pipes 14 are fixed to the support block 31 as shown in FIG. 13 and extend parallel to the movement direction of the powder box 11. The pipes 14 includes a plurality of groups of pipes vertically spaced from each other. Each pipe in a first group of pipes and each pipe in a second group of pipes adjacent to the first group of pipes are staggered from each other in the vertical direction.

Due to this structure, a distance between adjacent pipes is increased so that the powder 1 can flow more smoothly between adjacent pipes 14. As a result, the filling time period is further shortened.

FIGS. 16 and 17 illustrate a fourth embodiment of the present invention. In this embodiment, in a case where the cavity 20 has a rectangular plan configuration, the pipes 14 extend parallel to each other and in a direction perpendicular to the movement direction of the powder box 11. First ends of the pipes 14 are supported by a side wall 11a of the powder box 11. Second ends of the pipes are closed and are free. In the side wall 11a a gas passage (not shown) is formed like in the case of FIG. 14 and apertures (not shown) for receiving pipe ends are formed.

Due to this structure, when the powder box 11 is moved toward the position just above the cavity 20, the pipes operate to fill more uniformly the powder into the cavity 20.

FIGS. 18–22 illustrate a fifth embodiment of the present invention. In this embodiment, in a case where the cavity 20 has a rectangular plan configuration, the pipes 14 extend parallel to each other and in a direction perpendicular to the movement direction of the powder box 11. In a case where the height of the powder box 11 is great, a greater weight of the powder acts on the pipes 14. To prevent the pipes 14 from being destroyed when receiving additional force from the powder 1, the pipes 14 are supported at opposite ends thereof. Each pipe is coupled to the powder box 11 on at least one end thereof to prevent the pipe from rotating about its axis.

Figure 19:
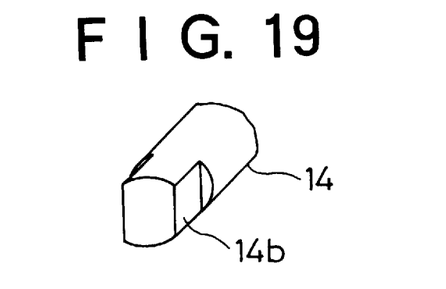
FIG. 19 is an enlarged oblique view of a pipe end of the apparatus of FIG. 18.
Figure 20:
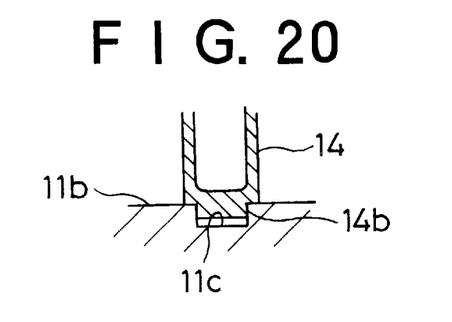
FIG. 20 is a cross-sectional view of the pipe end of FIG. 19 supported by a side wall of the powder box.
Figure 21:
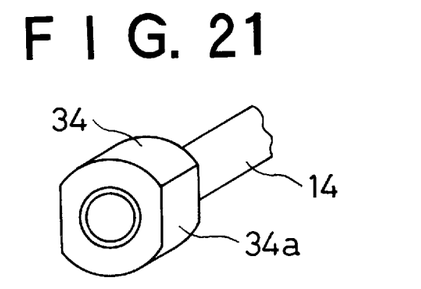
FIG. 21 is an enlarged oblique view of another example of a pipe end of the apparatus of FIG. 18.
Figure 22:
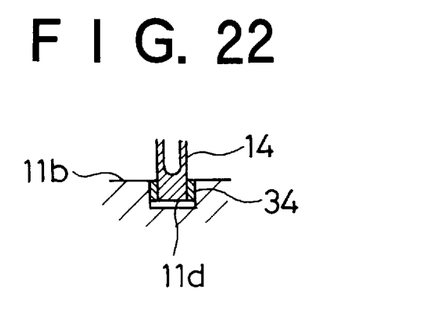
FIG. 22 is a cross-sectional view of the pipe end of FIG. 21 supported by a side wall of the powder box.

More particularly, in a case where the pipe 14 has a relatively large outside diameter, as illustrated in FIG. 19, two parallel facets 14b are formed in an outside surface of the pipe 14. In a side wall 11b of the powder box 11, a hole 11c having two parallel facets at its inside surface is formed. The end of the pipe 14 is inserted into the hole 11c so that the facets of the pipe 14 and the facets of the hole 11c engage each other whereby the pipe 14 is prevented from rotating about its axis. In a case where the pipe 14 has a relatively small outside diameter, a member 34 having a greater outside diameter than the pipe 14 is fixed to the end of the pipe 14, and two parallel facets 34a are formed in the member 34. In a side wall 11b of the powder box 11, a hole 11d having two parallel facets at its inside surface is formed. The member 34 is inserted into the hole 11d so that the facets of the member 34 and the facets of the hole 11d engage each other whereby the pipe 14 is prevented from rotating about its axis.

FIGS. 23 and 24 illustrates a sixth embodiment of the present invention, which is a visualized apparatus 30 simulating the powder filling apparatus 1 according to any one of the first to fifth embodiments of the present invention and used for determining optimum powder filling conditions. The apparatus 30 includes a mechanism capable of conducting three kinds of powder filling: filling the cavity with powder by dropping powder into the cavity, filling the cavity with powder by suctioning the powder into the cavity, and filling the cavity with powder by pushing up the powder into the cavity. The apparatus 30 includes a powder box 11A, a cavity simulating device 41 and a measurement device 51.

The powder box 11A corresponds to the powder box 11 of the first embodiment of the present invention and has a wall a portion 11B of which is transparent. In the powder box 11A, at least one pipe 36 corresponding to the pipe 14 of the first embodiment of the present invention is disposed. To the pipe 36 a gas source 37 is connected. The powder box 11 A is moved in the X—X and Y—Y directions (see FIG. 24) by cylinders (not shown).

The cavity simulating device 41 includes a table 42 simulating the table 18 of the first embodiment of the present invention, a punch 43 and a punch 44 simulating the punches 22 and 23, respectively, of the first embodiment of the present invention, and a cavity wall 45 which is transparent. A depth of a cavity 40 which corresponds to the cavity 20 of the first embodiment of the present invention can be changed by replacing the punches 43 and 44 with new punches. FIG. 24 illustrates one example of the cavity 40.

The measurement device 51 includes a CCD camera 53 and an 8 mm video camera 52 opposite the transparent cavity wall 45. The measurement device 51 includes a recorder 54 for recording a static image connected to the CCD camera 53, a recorder 55 for recording a dynamic image connected to the video camera 51, and analyzer 56 for analyzing the images connected to the recorders 54 and 55, and a display (monitor) 57 connected to the recorders 54 and 55.

Using the apparatus 30, observation and analysis about powder filling is made so that optimum conditions for filling the cavity 20 with the powder 1 are determined for each embodiment of the present invention.

More particularly, the cavity is filled with powder changing the powder filling conditions in various ways. The filling process is recorded by the video camera 52 and the filled state is recorded by CCD camera 53. The filling time period is measured and the powder's behavior as the air in the cavity is replaced by the powder is observed and recorded.

Further, the distribution of fine and coarse particles of the powder in the cavity is observed and analyzed. Based on these data, optimum filling conditions are determined to each cavity configuration.

According to the method and apparatus of any embodiment of the present invention, since gas is supplied into the powder in the powder box, the particles of the powder are movable relative to each other, and the powder can enter smoothly into the cavity without whirling up in the cavity. As a result, the filling time period is shortened and the particle size distribution in the cavity is uniform. This means that a sinter produced by heating the powder configured by the cavity has a uniform density and a high accuracy in dimension.

Although the present invention has been described with reference to specific exemplary embodiments, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A method for filling powder into a cavity formed in a die, comprising:

supplying powder into a powder box which is movable toward and away from a position adjacent to said cavity, said powder box having at least one pipe having a plurality of holes formed therein for supplying gas therethrough;

supplying gas into said powder in said powder box through said plurality of gas holes so that particles of said powder in said powder box are movable relative to each other; and moving said powder box to said position adjacent to said cavity so that said powder in said powder box enters said cavity to fill said cavity with said powder.

2. A method according to claim 1, further comprising sintering said powder configured by said cavity.

3. A method according to claim 1, wherein said gas is supplied into said powder box at the following rate:

$$0.05 \leq Vg/Vp \leq 0.4 \text{ sec}^{-1}$$

where, Vg is a volume of gas supplied to said powder box per second, and

Vp is a volume of powder in said powder box.

4. A method according to claim 1, wherein said gas used is gas selected from the group consisting of dry air, gas not containing oxygen, and inert gas.

5. A method according to claim 1, wherein said gas used has a temperature equal to or greater than an ambient temperature.

6. A method according to claim 1, wherein said gas is supplied into said powder box at least while said powder box is located adjacent to said cavity.

7. A method according to claim 1, wherein said cavity has a wall, at least a portion of which is transparent, and further comprising the step of observing a state of said powder entering said cavity through the transparent portion of said wall and determining optimum powder filling conditions based on the observing step.

8. An apparatus for filling powder into a cavity formed in a die, comprising:

a powder box movable toward and away from a position adjacent to said cavity, said powder box being open at a portion thereof;

at least one pipe disposed within said powder box, each pipe having a plurality of holes formed therein for supplying gas therethrough into said powder in said powder box; and a gas source connected to said pipe via a hose.

9. An apparatus according to claim 8, wherein at least one pipe has an outside diameter D not less than 1 mm and not greater than 3 mm.

10. An apparatus according to claim 8, wherein at least one pipe includes a plurality of pipes disposed parallel to and spaced apart from each other, a ratio of a space w between adjacent pipes to a width W of said powder box being not less than 0.02 and not greater than 0.3.

11. An apparatus according to claim 8, wherein at least one pipe is located above and spaced from said bottom of said powder box, a ratio of a distance h of said pipe from said bottom of said powder box to a height H of said powder box being not less than 0.01 and not greater than 0.3.

12. An apparatus according to claim 8, wherein at least one pipe has a circular cross-section.

13. An apparatus according to claim 8, wherein at least one pipe has an oval cross-section with a longitudinal axis of said oval cross-section oriented vertically.

14. An apparatus according to claim 8, wherein said plurality of holes each have a diameter not smaller than 10 $\mu$m and not greater than 200 $\mu$m.

15. An apparatus according to claim 8, wherein adjacent holes of said plurality of holes are spaced between 3 to 10 mm apart in a longitudinal direction of at least one pipe.

16. An apparatus according to claim 8, wherein 1 to 6 holes of said plurality of holes are formed in a transverse cross-section of at least one pipe and are spaced apart from each other in a circumferential direction around said one pipe.

17. An apparatus according to claim 8, wherein said plurality of holes includes a first group of holes formed in an upper half portion of said at least one pipe and a second group of holes formed in a lower half portion of said at least one pipe, each of said first group of holes having a greater diameter than each of said second group of holes.

18. An apparatus according to claim 8, wherein at least one pipe is made from stainless steel.

19. An apparatus according to claim 8, wherein said cavity has a rectangular plan configuration, and at least one pipe extends straight.

20. An apparatus according to claim 19, wherein at least one pipe extends straight in a direction in which said powder box is moved.

21. An apparatus according to claim 19, wherein at least one pipe extends straight in a direction perpendicular to a direction in which said powder box is moved.

22. An apparatus according to claim 21, wherein at least one pipe has a tip end at which said pipe is supported by said powder box.

23. An apparatus according to claim 8, wherein at least one pipe includes a plurality of groups of pipes vertically spaced from each other, each pipe of a first group of pipes and each pipe of a second group of pipes adjacent to said first group of pipes and being staggered from each other in a vertical direction.

24. An apparatus according to claim 8, wherein said apparatus is an apparatus for simulating powder filling and for determining optimum powder filling conditions and said cavity is defined by a cavity wall, a portion of which is transparent.

25. An apparatus according to claim 24, further comprising a CCD camera opposite said transparent portion of said cavity defining wall.

26. An apparatus according to claim 24, further comprising a video camera opposite said transparent portion of said cavity defining wall.

27. A method according to claim 1, wherein said powder enters said cavity by gravity.

28. A method according to claim 1, wherein said powder enters said cavity by suction of said powder into said cavity.

29. A method according to claim 1, wherein said powder enters said cavity by pushing said powder up into said cavity.

* * * * *